United States Patent
Izumi et al.

(10) Patent No.: US 8,616,587 B2
(45) Date of Patent: Dec. 31, 2013

(54) CRYO-ROTARY JOINT

(75) Inventors: Mitsuru Izumi, Tokyo-To (JP);
Motohiro Miki, Tokyo-To (JP);
Masahiro Kitano, Tokyo-To (JP)

(73) Assignees: National University Corporation Tokyo University of Marine Science and Technology, Tokyo (JP); Kitano Seiki Co., Ltd., Tokyo (JP)

( * ) Notice: Subject to any disclaimer, the term of this patent is extended or adjusted under 35 U.S.C. 154(b) by 0 days.

(21) Appl. No.: 13/376,134

(22) PCT Filed: Jun. 2, 2010

(86) PCT No.: PCT/JP2010/059365
§ 371 (c)(1),
(2), (4) Date: Feb. 20, 2012

(87) PCT Pub. No.: WO2010/140627
PCT Pub. Date: Dec. 9, 2010

(65) Prior Publication Data
US 2012/0133126 A1 May 31, 2012

(30) Foreign Application Priority Data
Jun. 2, 2009 (JP) ................................. 2009-133204

(51) Int. Cl.
*F16L 27/00* (2006.01)
(52) U.S. Cl.
USPC ........................... 285/272; 285/275; 285/904
(58) Field of Classification Search
USPC ............................... 285/275, 272.1, 272, 904
See application file for complete search history.

(56) References Cited

U.S. PATENT DOCUMENTS 3,823,569 A * 7/1974 Sellmaier et al. ................ 310/61
3,843,171 A * 10/1974 Hewlett ......................... 285/904
3,991,587 A 11/1976 Laskaris
(Continued)

FOREIGN PATENT DOCUMENTS

CN 1677809 A 10/2005
CN 201297390 Y 8/2009
(Continued)

OTHER PUBLICATIONS

International Preliminary Report and Written Opinion of the International Searching Authority for PCT/JP2010/059365, filed Jun. 2, 2010.
Chinese Office Action issued on Mar. 5, 2013 to Chinese Patent Application No. 201080021395.3, corresponding to the instant U.S. Application. English translation provided.

*Primary Examiner* — David E Bochna
(74) *Attorney, Agent, or Firm* — Harness, Dickey & Pierce, P.L.C.

(57) ABSTRACT

A joint includes a housing and a refrigerant tube connected to a refrigerant source and communicated with a target part in a rotating machine. A rotating member is loosely fitted inside with the refrigerant tube and fixed to a rotary part of the rotating machine. A relatively rotating member has a fixed-side member and rotating-side member. The fixed-side member is connected to the refrigerant tube via a refrigerant tube extension section. The rotating-side member is connected to the rotating member via a rotating member extension section. A refrigerant zone is formed by spaces defined between the refrigerant tube and the rotating member, and between the refrigerant tube and rotating member extension sections. A sealing member is installed between the fixed-side and rotating-side members. A vacuum chamber and pressure chamber are defined within the housing.

20 Claims, 10 Drawing Sheets

(56) References Cited

U.S. PATENT DOCUMENTS

| | | | |
|---|---|---|---|
| 3,991,588 A * | 11/1976 | Laskaris | 285/904 |
| 4,018,059 A * | 4/1977 | Hatch | 285/904 |
| 4,207,745 A * | 6/1980 | Pouillange | 285/904 |
| 6,412,289 B1 | 7/2002 | Laskaris et al. | |
| 6,623,043 B1 * | 9/2003 | Pollack | 285/904 |
| 8,336,921 B2 * | 12/2012 | Takahashi et al. | 285/904 |

FOREIGN PATENT DOCUMENTS

| | | |
|---|---|---|
| EP | 1261115 A1 | 11/2002 |
| JP | 08-051767 A | 2/1996 |
| JP | 2003-65477 A | 3/2003 |
| JP | 2006-95616 | 4/2006 |
| WO | WO-2006-080280 A1 | 8/2006 |

\* cited by examiner

CRYO-ROTARY JOINT

TECHNICAL FIELD

The present invention relates to a cryo-rotary joint.

More particularly, the present invention relates to a cryo-rotary joint which lends itself to extreme downsizing by using a structure in which a cylindrical relatively rotating member is used for a sealing portion between a rotary part and stationary part of the rotary joint and a refrigerant tube is passed internally through the relatively rotating member.

Also, the present invention relates to a cryo-rotary joint which can prevent freezing of a sealing member by placing a sealing portion between a rotary part and stationary part of the rotary joint at a location thermally distant from a target part in a rotating machine, prevent loss of a refrigerant due to frictional heat of the sealing portion, and prevent conduction heat via tubes from outside.

BACKGROUND ART

Generally, a rotary joint refers to a mechanism which can join a fixed portion and rotating portion of a machine and circulate a fluid between the fixed portion and rotating portion without leakage.

A gap is provided in a sliding-contact portion between the fixed portion and rotating portion of the machine to join the fixed portion and rotating portion and circulate a fluid between the fixed portion and rotating portion without leakage, and the gap needs to be sealed to prevent the fluid from leaking.

Conventional rotary joints are configured to be able to receive and deliver the fluid, with the fixed portion provided on an outer circumferential section, the rotating portion installed as a rotating shaft in the fixed portion, a fluid flow path installed in the rotating shaft, an inlet and outlet of the fluid flow path installed in a circumferential surface of the fluid flow path, and an annular groove installed in an inside part of the rotating portion corresponding to a rotation trajectory of the inlet and outlet of the fluid flow path. A sealing member is installed between the fixed portion and rotating portion around the fluid flow path to prevent leakage of the fluid (Japanese Patent Laid-Open No. 2006-95616).

Since the cryo-rotary joint uses a refrigerant as a fluid, it is preferable to thermally insulate the refrigerant using a vacuum, but introduction of a vacuum portion tends to increase apparatus size in radial direction. Also, functions of the sealing member, which is placed in contact with the refrigerant, is impaired by freezing. Also, there will be leakage of the fluid. Also, a joint portion will grow in size even if not frozen. Furthermore, frictional heat of the sealing member is transmitted to the refrigerant, increasing temperature of the refrigerant and posing an additional problem in that the refrigerant needs to be supplied in large amounts.

FIG. 10 shows a conventional cryo-rotary joint.

The cryo-rotary joint 101 in FIG. 10 is fixed to an end wall on a side opposite to an output shaft 103 of a rotating machine 102 and configured to be able to supply a refrigerant to a target part 104 of the rotating machine 102.

A rotating portion is shown shaded in FIG. 10. The rotating portion of the cryo-rotary joint 101 makes up a rotating shaft 105 rotatably supported in a housing 106 of a fixed portion.

A refrigerant supply tube 107 and refrigerant return tube 108 are installed in the rotating shaft 105 in such a way as to be rotatable with the rotating shaft 105.

The rest of the rotating shaft 105 except for the refrigerant supply tube 107 and refrigerant return tube 108 makes up a vacuum chamber to thermally insulate the refrigerant supply tube 107 and refrigerant return tube 108 using a vacuum.

Disk-shaped rotating-side members 109 and 110 are installed on a circumferential surface of the rotating shaft 105, allowing passage of the refrigerant supply tube 107 and refrigerant return tube 108 therethrough and serving as a rotating side of a relatively rotating member.

An evacuation hole 111 for use to evacuate the interior of the rotating shaft 105 is provided in an end wall of the rotating shaft 105.

Refrigerant chambers 112 and 113 adapted to receive outlets of the refrigerant supply tube 107 and refrigerant return tube 108 are installed inside the housing 106. A disk-shaped partition wall 114 is installed between the refrigerant chambers 112 and 113, partitioning the refrigerant chambers 112 and 113 from each other and getting between the disk-shaped rotating-side members 109 and 110.

Refrigerant supply channel 115 and refrigerant return channel 116 are installed in the housing 106, being communicated with the refrigerant chambers 112 and 113, respectively. Also, an evacuated channel 117 communicated with the evacuation hole 111 is installed in the housing 106.

The refrigerant supply tube 107 and refrigerant supply channel 115 form a flow path for supply of the refrigerant. On the other hand, the refrigerant return tube 108 and refrigerant return channel 116 form a flow path for return of the refrigerant. The evacuation hole 111 and evacuated channel 117 form a flow path for evacuation.

A bellows 118 and sealing member 119 are respectively installed between each of both sides of the disk-shaped rotating-side member 109 and an inner wall of the refrigerant chamber 112, and the disk-shaped partition wall 114.

The bellows 118 resiliently presses the sealing member 119 against the disk-shaped rotating-side member 109.

Consequently, in the flow path for supply of the refrigerant, the refrigerant delivered from the housing's refrigerant supply channel 115 on the stationary side to the refrigerant supply tube 107 on the rotating side is prevented from leaking from the refrigerant chamber 112 serving as a supply location.

Reference numeral 120 denotes sealing members adapted to seal connections with an external refrigerant tube.

Similarly, a bellows 118 and sealing member 119 are respectively installed between each of both sides of the disk-shaped rotating-side member 110 and an inner wall of the refrigerant chamber 113, and the disk-shaped partition wall 114.

In the flow path for return of the refrigerant, the bellows 118 and sealing member 119 prevent the refrigerant delivered from the refrigerant return tube 108 on the rotating side to the housing's refrigerant return channel 116 on the stationary side from leaking from the refrigerant chamber 113 serving as a supply location.

CITATION LIST

Patent Documents

Patent Document 1: Japanese Patent Laid-Open No. 2006-95616

SUMMARY OF INVENTION

Problems to be Solved by the Invention

As described above, in the conventional cryo-rotary joint, the bellows 118 and sealing members 119 are installed between each of both sides of the disk-shaped rotating-side members 109 and 110, and the inner walls of the refrigerant chambers 112 and 113, and the disk-shaped partition wall 114.

The disk-shaped partition wall 114 has to get deeply between the disk-shaped rotating-side members 109 and 110 to secure sliding-contact surfaces for the sealing members 119.

For that, the above-described conventional cryo-rotary joint essentially has a large outside diameter in radial direction.

Also, with the conventional cryo-rotary joint, the refrigerant supply channel 115 and refrigerant return channel 116 have to be installed serially in length direction (direction of the rotating shaft).

Thus, the above-described conventional cryo-rotary joint has a large dimension in the length direction, which acts as a major contributing factor to increases in the size of the rotary joint.

Furthermore, formation of the vacuum chamber of adequate volume in the rotating shaft 105 also acts as a contributing factor to increases in the size of the rotary joint.

Consequently, the conventional cryo-rotary joint has a problem of having a large size compared to the rotating machine 102.

Thus, one of the problems to be solved by the present invention is to provide a cryo-rotary joint small in size and light in weight.

The conventional cryo-rotary joint has a problem in that the temperature of the refrigerant is increased by frictional heat of the sealing members.

As described above, the conventional cryo-rotary joint achieves sealing by pressing the sealing members 119 against the disk-shaped rotating-side members 109 and 110.

However, since the disk-shaped rotating-side members 109 and 110 rotate together with the rotating shaft 105, the sealing members 119 are rubbed with the disk-shaped rotating-side members 109 and 110, generating heat. The sealing members 119 are placed in contact with the flow paths of the refrigerant, and consequently the frictional heat of the sealing members 119 is transferred directly to the refrigerant, increasing the refrigerant temperature.

To prevent increases in the refrigerant temperature, it is necessary to supply the refrigerant in large amounts and cool the refrigerant externally. This will cause energy loss and reduced efficiency.

The conventional cryo-rotary joint has another heat entry path.

As shown in FIG. 10, the refrigerant flow paths of the conventional cryo-rotary joint are formed in part by the housing 106 (the refrigerant supply channel 115 and refrigerant return channel 116).

Consequently, heat from the housing 106 enters the refrigerant through the sealing members 120 and the like, resulting in increases in refrigerant temperature.

It is not easy to thermally insulate the entire housing 106 and thus it is difficult to prevent increases in the refrigerant temperature.

Thus, another problem to be solved by the present invention is to provide a cryo-rotary joint with reduced heat entry into the refrigerant and with high energy efficiency.

Means for Solving the Problems

A cryo-rotary joint according to the present invention includes: a housing; a refrigerant tube configured to be non-rotating, installed within the housing, connected at one end to an external refrigerant source, communicated at the other end with a target part in a rotating machine, and adapted to allow a refrigerant to pass inside; a rotating member installed within the housing, loosely fitted inside with the refrigerant tube, and configured to be rotatable together with a rotary part of the rotating machine by being fixed at one end to the rotary part; and a relatively rotating member configured to be cylindrical in shape and coaxial with the refrigerant tube and the rotating member and equipped with a fixed-side member fixed to an inner surface of the housing and a rotating-side member rotatably disposed inside the fixed-side member, the fixed-side member of the relatively rotating member being connected to the refrigerant tube via a refrigerant tube extension section, the rotating-side member of the relatively rotating member being connected to the rotating member via a rotating member extension section, a space between the refrigerant tube and the rotating member as well as a space between the refrigerant tube extension section and the rotating member extension section being communicated with a gap between the fixed-side member and rotating-side member of the relatively rotating member to form a refrigerant zone, a sealing member being installed between the fixed-side member and rotating-side member of the relatively rotating member, and a vacuum chamber and a pressure chamber being defined within the housing by a peripheral wall of the refrigerant tube, the refrigerant tube extension section, and the fixed-side member of the relatively rotating member with the refrigerant zone between the refrigerant tube extension section and the rotating member extension section being thermally insulated by the vacuum chamber.

The sealing member installed between the fixed-side member and rotating-side member of the relatively rotating member may be made of a magnetic fluid sealing member.

A low-temperature resistant sealing member may be installed at that part of the refrigerant zone which is closer to the refrigerant tube than to the sealing member.

The gap between the fixed-side member and rotating-side member of the relatively rotating member may be pressurized by pressure of the pressure chamber from a refrigerant-free side.

The cryo-rotary joint may include a pressure chamber member which forms a pressure chamber connected to the fixed-side member of the relatively rotating member, engaged with the rotating-side member of the relatively rotating member via the sealing member, and communicated with a refrigerant-free side of the gap between the fixed-side member and rotating-side member of the relatively rotating member, wherein the gap between the fixed-side member and rotating-side member of the relatively rotating member may be pressurized by pressure of the pressure chamber from a refrigerant-free side; and the refrigerant zone between the refrigerant tube extension section and the rotating member extension section may be thermally insulated from at least one side.

The housing may have connecting surfaces disconnectable in a direction orthogonal to an axial direction of the refrigerant tube; a connection between the fixed-side member of the relatively rotating member and the refrigerant tube extension section may be configured to be separable; and the refrigerant tube and the refrigerant tube extension section thereof may be configured to be unpluggable when the connecting surfaces of the housing are disconnected.

The refrigerant tube may be a double wall tube having an inner tube for refrigerant supply.

Another cryo-rotary joint according to the present invention includes: a rotating-machine housing; a refrigerant tube configured to be non-rotating, installed within the rotating-machine housing, connected at one end to an external refrigerant source, communicated at the other end with a target part of a rotating machine, and adapted to allow a refrigerant to pass inside; a rotating member installed within the rotating-machine housing, loosely fitted inside with the refrigerant tube, and configured to be rotatable together with a rotary part of the rotating machine by being fixed at one end to the rotary part; and a relatively rotating member configured to be cylindrical in shape and coaxial with the refrigerant tube and the rotating member and equipped with a fixed-side member fixed to the rotating-machine housing and a rotating-side member rotatably disposed inside the fixed-side member, the fixed-side member of the relatively rotating member being connected to the refrigerant tube via a refrigerant tube extension section, the rotating-side member of the relatively rotating member being connected to the rotating member via a rotating member extension section, a space between the refrigerant tube and the rotating member as well as a space between the refrigerant tube extension section and the rotating member extension section being communicated with a gap between the fixed-side member and rotating-side member of the relatively rotating member to form a refrigerant zone, a sealing member being installed between the fixed-side member and rotating-side member of the relatively rotating member, and a vacuum chamber and a pressure chamber being defined within the housing by a peripheral wall of the refrigerant tube, the refrigerant tube extension section, and the fixed-side member of the relatively rotating member with the refrigerant zone between the refrigerant tube extension section and the rotating member extension section being thermally insulated by the vacuum chamber.

Advantages of the Invention

The cryo-rotary joint according to the present invention includes the relatively rotating member configured to be cylindrical in shape and coaxial with the refrigerant tube and the rotating member and equipped with a fixed-side member fixed to the housing and a rotating-side member rotatably disposed inside the fixed-side member.

Since the fixed-side member of the cylindrical relatively rotating member is connected to the refrigerant tube via a refrigerant tube extension section and the rotating-side member of the relatively rotating member is connected to the rotating member via a rotating member extension section, the cylindrical relatively rotating member serves as a sealing portion, i.e., a portion where the rotating portion and fixed portion of the rotary joint move relative to each other.

In this way, being cylindrical in shape and installed coaxially with the refrigerant tube and the rotating member, the relatively rotating member according to the present invention can implement a cryo-rotary joint of smaller outside diameter than the conventional cryo-rotary joint in which part of the disk-shaped relatively rotating member in the radial direction is used for sealing.

Also, whereas the conventional cryo-rotary joint needs to have a large dimension in the length direction because the refrigerant supply channel and refrigerant return channel (inlet and outlet of the refrigerant tube) have to be installed serially in the length direction (direction of the rotating shaft), the cryo-rotary joint according to the present invention allows drastic downsizing in the length direction because the refrigerant tube is installed in central part, being connected at one end to an external refrigerant source and communicated at the other end with a target part of the rotating machine.

Also, in the cryo-rotary joint according to the present invention, the fixed-side member of the cylindrical relatively rotating member is connected to the refrigerant tube via the refrigerant tube extension section, the rotating-side member of the relatively rotating member is connected to the rotating member via the rotating member extension section, and the space between the refrigerant tube and rotating member as well as the space between the refrigerant tube extension section and rotating member extension section are communicated with the gap between the fixed-side member and rotating-side member of the relatively rotating member to form the refrigerant zone.

According to the present invention, since the fixed-side member and rotating-side member of the relatively rotating member serves as a sealing portion between the rotating portion and fixed portion of the rotary joint and the sealing portion is installed at a location distant from, and without thermal contact with, a main body of the refrigerant tube, there is no heat transfer from the sealing member to the refrigerant tube. This provides a cryo-rotary joint of extremely high efficiency.

Viewed conversely, in spite of its small size, the cryo-rotary joint according to the present invention allows the sealing portion between the rotating portion and fixed portion to keep a large effective distant from the main body of the refrigerant tube without thermal contact and thereby prevents the sealing portion from being frozen by the refrigerant. This results in a high-efficiency, cryo-rotary joint which can reduce refrigerant leakage, use a magnetic fluid sealing member, and prevent heat loss.

With the fixed-side member and rotating-side member of the relatively rotating member incorporated in the rotating-machine housing of the rotating machine, the cryo-rotary joint according to the present invention not only allows further downsizing in the length direction, but also allows the rotating machine and cryo-rotary joint to share a housing member and a vacuum mechanism, resulting in a still smaller, high-efficiency, cryo-rotary joint.

Also, the cryo-rotary joint according to the present invention may have a low-temperature resistant sealing member installed at that part of the refrigerant zone which is closer to the refrigerant tube than to the sealing member, in addition to the configuration in which the fixed-side member of the cylindrical relatively rotating member is connected to the refrigerant tube via the refrigerant tube extension section, the rotating-side member of the relatively rotating member is connected to the rotating member via the rotating member extension section, the space between the refrigerant tube and the rotating member as well as the space between the refrigerant tube extension section and the rotating member extension section are communicated with the gap between the fixed-side member and rotating-side member of the relatively rotating member to form the refrigerant zone, and a sealing member is installed between the fixed-side member and rotating-side member of the relatively rotating member.

This configuration not only provides a dual sealing effect, but also makes it possible to use a low-temperature resistant sealing member for that part of the sealing member which is close to the refrigerant tube, prevent the pressure and low temperature of the refrigerant from directly affecting the sealing member between the fixed-side member and rotating-side member of the relatively rotating member, and thereby use a sealing member, such as a magnetic fluid sealing member, with high sealing ability for the sealing member between the fixed-side member and rotating-side member of the relatively rotating member, thereby achieving high reliability and high hermeticity.

Also, the cryo-rotary joint according to the present invention allows the vacuum chamber and the pressure chamber to be defined within the housing by the refrigerant tube peripheral wall, the refrigerant tube extension member, and the fixed-side member of the relatively rotating member.

When the vacuum chamber is defined by the refrigerant tube peripheral wall, the refrigerant tube extension member, and the fixed-side member of the relatively rotating member, the refrigerant zone formed by the space between the refrigerant tube extension section and the rotating member extension section is thermally insulated at least on one side by the vacuum chamber and the gap between the fixed-side member and rotating-side member of the relatively rotating member is pressurized from the refrigerant-free side by the pressure of the pressure chamber, making it possible to prevent refrigerant leakage.

Furthermore, the cryo-rotary joint according to the present invention can include the pressure chamber member which forms the pressure chamber connected to the fixed-side member of the relatively rotating member, engaged with the rotating-side member of the relatively rotating member via the sealing member, and communicated with the refrigerant-free side of the gap between the fixed-side member and rotating-side member of the relatively rotating member.

With this configuration, the cryo-rotary joint according to the present invention can pressurize the gap between the fixed-side member and rotating-side member of the relatively rotating member from the refrigerant-free side using the pressure of the pressure chamber, preventing refrigerant leakage completely, and thermally insulate both sides of the refrigerant zone formed by the space between the refrigerant tube extension section and the rotating member extension section, using the vacuum chamber.

Also, the cryo-rotary joint according to the present invention, can allow the housing to be disassembled along the connecting surfaces disconnectable in a direction orthogonal to the axial direction of the refrigerant tube and configure the connection between the fixed-side member of the relatively rotating member and the refrigerant tube extension section to be separable.

This configuration allows the refrigerant tube and the refrigerant tube extension section thereof to be unplugged when the connecting surfaces of the housing are disconnected. In particular, this achieves easy accessibility to the sealing member which requires maintenance.

Finally, in the cryo-rotary joint according to the present invention, the refrigerant tube can be a double wall tube having an inner tube for refrigerant supply.

This configuration makes it possible to supply the refrigerant to the target part of the rotating machine through the inner tube for refrigerant supply and return the refrigerant recovered from the target part of the rotating machine through an outer tube of the double wall tube, circulating the refrigerant with high efficiency.

BEST MODE FOR CARRYING OUT THE INVENTION

Embodiments of the present invention will be described below.

Figure 1:
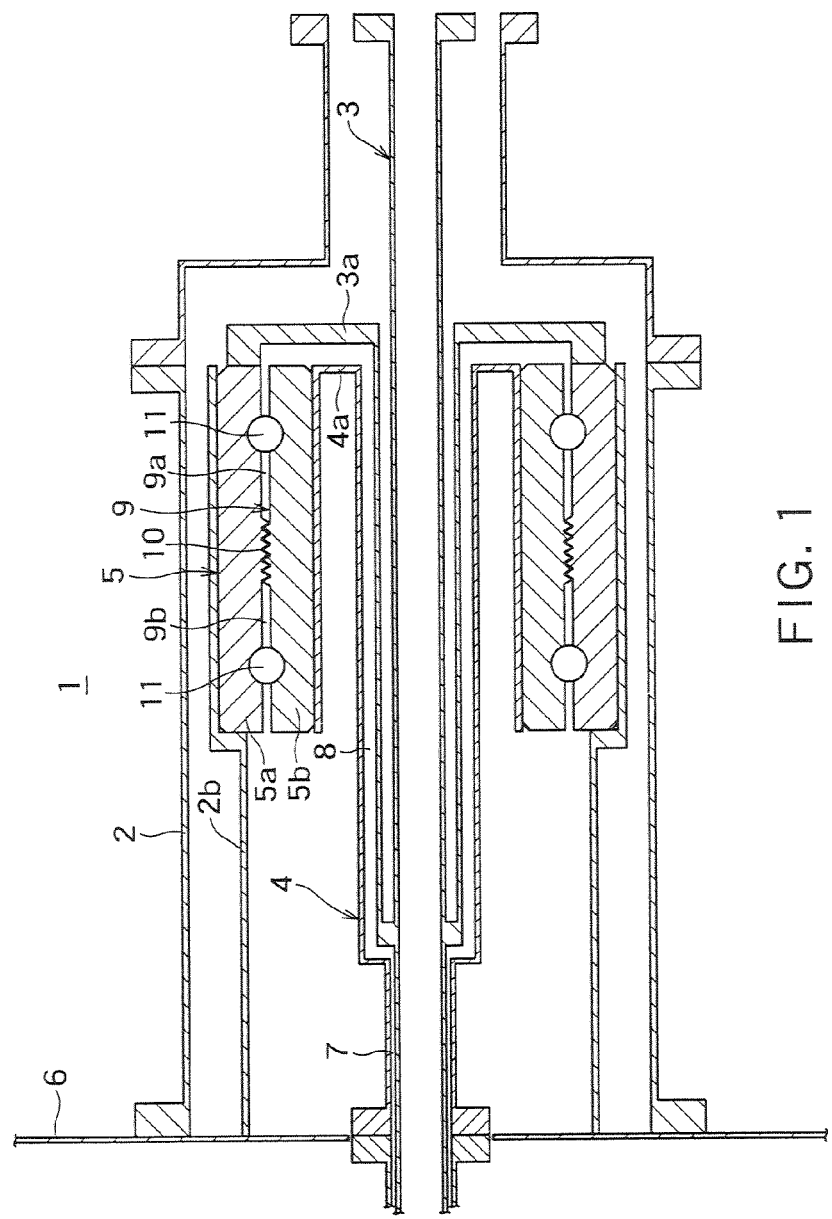
FIG. 1 is a longitudinal sectional view of a cryo-rotary joint according to an embodiment of the present invention.

FIG. 1 shows a longitudinal sectional view of a cryo-rotary joint according to an embodiment of the present invention.

As shown in FIG. 1, the cryo-rotary joint 1 according to the present embodiment includes a housing 2, a non-rotating refrigerant tube 3, a rotating member 4 configured to be rotatable, and a relatively rotating member 5 cylindrical in shape.

The cryo-rotary joint 1 is mounted on an end wall 6 of a rotating machine (not shown). In FIG. 1, portions which rotate are shown shaded and portions which do not rotate are shown hatched indicating a cross section.

The refrigerant tube 3 is installed within the housing 2, connected at one end to an external refrigerant source (not shown), communicated at the other end with a target part (not shown) in the rotating machine, and adapted to allow a refrigerant to pass inside.

Preferably, the refrigerant tube 3 is installed coaxially with a rotating shaft of the rotating machine.

When it is stated that the refrigerant tube 3 is "connected" to an external refrigerant source or "communicated" with a target part in the rotating machine, this refers not only to cases where the refrigerant tube 3 is connected or communicated directly, but also to cases where the refrigerant tube 3 is connected to the external refrigerant source or communicated with the target part in the rotating machine, indirectly via another member or tube using flanges or the like as shown in FIG. 1.

The rotating member 4 is loosely fitted inside with the refrigerant tube 3 and configured to be rotatable together with a rotary part of the rotating machine by being fixed at one end to the rotary part.

When it is stated that the rotating member 4 is fixed to the rotary part of the rotating machine, this refers not only to cases where the rotating member 4 is fixed directly, but also to cases where the rotating member 4 is fixed to the rotary part of the rotating machine indirectly via another member using flanges or the like as shown in FIG. 1.

The relatively rotating member 5 is a portion where the rotating portion and fixed portion of the rotary joint move relative to each other while providing a seal. The relatively rotating member 5 is cylindrical in shape as a whole and installed coaxially with the refrigerant tube 3 and rotating member 4.

A fixed-side member 5a of the relatively rotating member 5 is fixed to an inner surface of the housing 2 and a rotating-side member 5b of the relatively rotating member 5 is rotatably disposed inside the fixed-side member 5a. Incidentally, when it is stated that "a fixed-side member 5a is fixed to an inner surface of the housing 2," this refers not only to cases where the fixed-side member 5a is fixed to the inner surface of the housing 2 directly, but also to cases where the fixed-side member 5a is fixed to the inner surface of the housing 2 indirectly via the end wall 6 of the rotating machine or another member 2b as shown in FIG. 1.

The fixed-side member 5a of the relatively rotating member 5 is connected to the refrigerant tube 3 via a refrigerant tube extension section 3a.

The rotating-side member 5b of the relatively rotating member 5 is connected to the rotating member 4 via a rotating member extension section 4a.

The term "connect" includes a disconnectable connection.

The fixed-side member 5a is located on an outer side of the rotating-side member 5b, the rotating member 4 is located on an outer side of the refrigerant tube 3, the fixed-side member 5a is connected to the refrigerant tube 3 via the refrigerant tube extension section 3a, and the rotating-side member 5b is connected to the rotating member 4 via the rotating member extension section 4a. Inevitably, the refrigerant tube extension section 3a and rotating member extension section 4a have sharply bent, wrap-around shapes as shown in FIG. 1.

Also, in addition to the sharply bent shapes described above, preferably the refrigerant tube extension section 3a and rotating member extension section 4a have certain lengths to reduce transmission of heat.

Thus, according to the present embodiment, the rotating member extension section 4a and refrigerant tube extension section 3a are extended from a location close to the rotating machine, turn around at a location close to an outer end of the refrigerant tube 3, and connected to the rotating-side member 5b and fixed-side member 5a, respectively.

A space 7 between the refrigerant tube 3 and rotating member 4 as well as a space 8 between the refrigerant tube extension section 3a and rotating member extension section 4a are communicated with a refrigerant-containing side 9a of a gap 9 between the fixed-side member and rotating-side member of the relatively rotating member 5 to form a refrigerant zone.

The gap 9 between the fixed-side member and rotating-side member of the relatively rotating member 5 serves as a sealing portion of the rotary joint which moves the rotating portion and fixed portion relative to each other while providing a seal, and a sealing member 10 is installed in the sealing portion.

According to the present embodiment, preferably a magnetic fluid sealing member is used as the sealing member 10 described above, but the sealing member is not limited to magnetic fluid sealing members. Incidentally, when a magnetic fluid sealing member is used, if concavity and convexity configured to fit with each other are provided in part of the gap 9 between the fixed-side member and rotating-side member of the relatively rotating member 5 as shown in FIG. 1 and a magnet is installed in the fixed-side member 5a or rotating-side member 5b so as to limit movement of the magnetic fluid sealing member, the magnetic fluid sealing member can be kept in place.

To keep the gap 9 between the fixed-side member and rotating-side member of the relatively rotating member 5 to a certain size, supporting means, such as a ball bearing 11, capable of rolling is installed as shown in FIG. 1.

Figure 2:
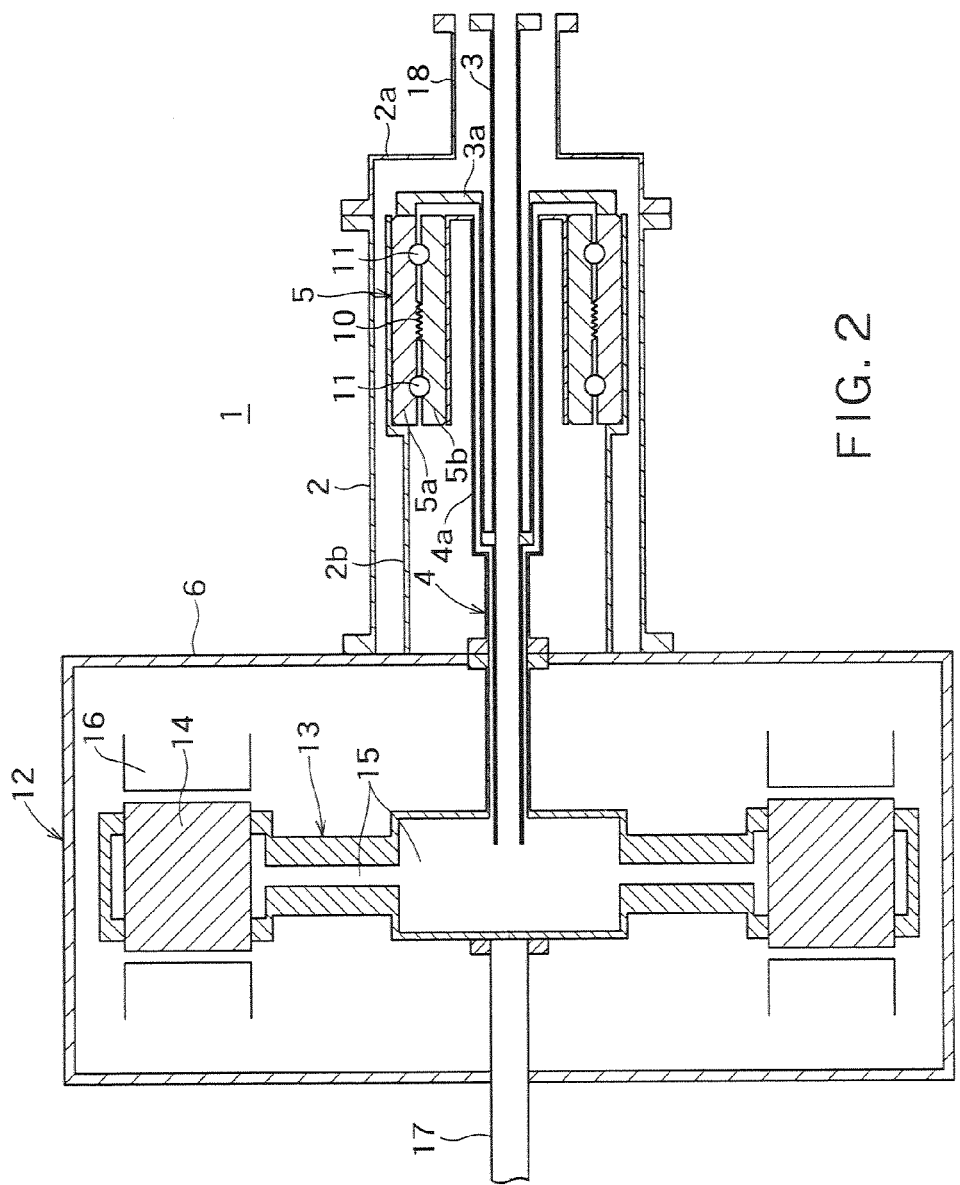
FIG. 2 is a longitudinal sectional view showing how the cryo-rotary joint according to the embodiment of the present invention is mounted.

FIG. 2 is a longitudinal sectional view showing how the cryo-rotary joint 1 is mounted.

As shown in FIG. 2, the cryo-rotary joint 1 is mounted on the end wall 6 of a rotating machine 12.

The rotating machine 12 has a rotary part. In the example of FIG. 2, the rotating machine 12 is an axial-type superconducting synchronous machine whose rotor 13 is the rotary part. A superconductor 14 is installed at a tip of the rotor 13 and a cooling flow path 15 of the refrigerant circulating around the superconductor 14 is formed within the rotor 13. In this case, the rotor 13 is the target part of the rotating machine 12. Reference numeral 16 denotes a field coil or armature coil.

An output shaft 17 is mounted on the opposite side surface of the rotor 13 from the cryo-rotary joint 1. The other end of the output shaft 17 sticks out of the rotating machine 12, allowing rotation of the rotor 13 to be taken out.

Incidentally, the cryo-rotary joint 1 has a large-diameter evacuation tube 18 installed on an end wall 2a of the housing 2 coaxially with the refrigerant tube 3, allowing the housing 2 to be evacuated through a gap between the evacuation tube 18 and refrigerant tube 3.

Figure 3:
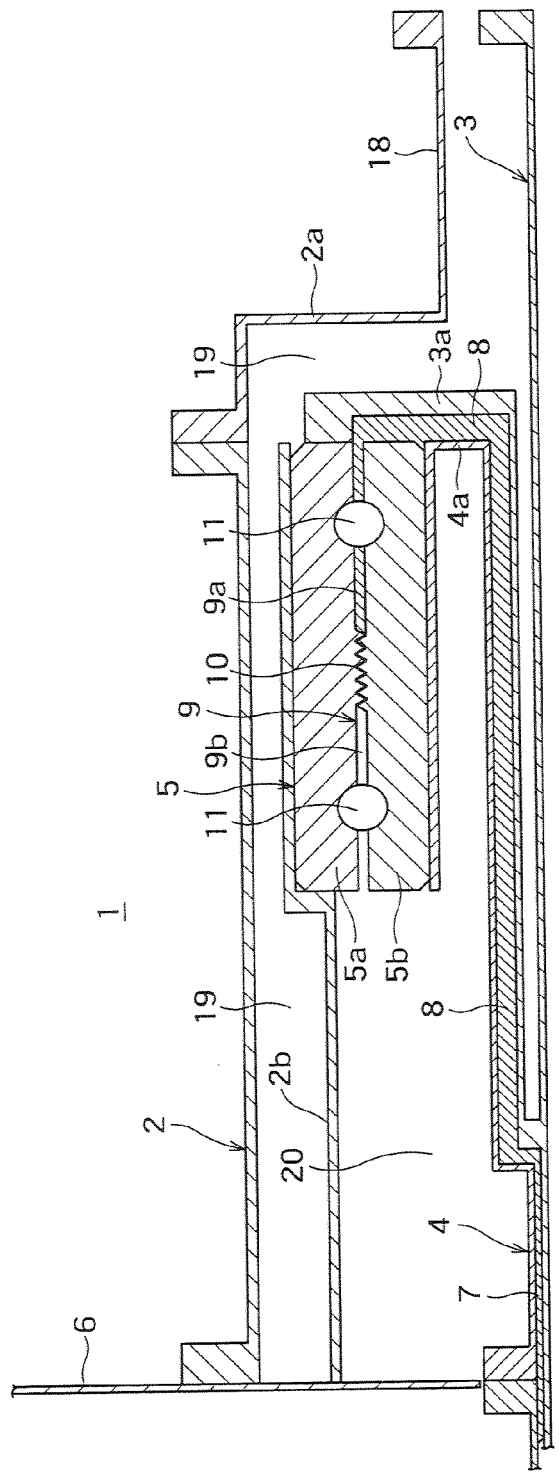
FIG. 3 is an explanatory diagram magnifying and showing a refrigerant zone and relatively rotating member of the cryo-rotary joint according to the embodiment of the present invention.

FIG. 3 shows an upper half of a rotating shaft of the cryo-rotary joint 1 according to the present embodiment, where the refrigerant zone and relatively rotating member 5 are shown magnified. Operation of the present invention will be described below with reference to FIG. 3.

The housing 2 is evacuated through the evacuation tube 18 before use. A vacuum chamber 19 and pressure chamber 20 are defined in the housing 2 by a peripheral wall of the refrigerant tube 3, the refrigerant tube extension member 3a, and the fixed-side member 5a of the relatively rotating member. When the housing 2 is evacuated through the evacuation tube 18, a vacuum is created in the vacuum chamber 19. On the other hand, the pressure chamber 20, which is insulated from the vacuum chamber 19, remains at normal pressure.

Also, the refrigerant is caused to pass through the refrigerant tube 3 to cool the target part in the rotating machine 12. When the target part is cooled sufficiently, the rotor is rotated. In the example of FIG. 2, after the superconductor 14 enters a superconducting state, the rotor is driven by the field coil or armature coil 16 or rotationally driven from outside.

As the rotary part of the rotating machine rotates, the rotating member 4 fixed to the rotary part of the rotating machine rotates together with the rotary part of the rotating machine and the fixed-side member 5a and rotating-side member 5b of the relatively rotating member 5 move relative to each other on both sides of the sealing member 10 (magnetic fluid sealing member).

Part of the refrigerant enters the space 7 between the refrigerant tube and rotating member, the space 8 between the refrigerant tube extension section and rotating member extension section, and the refrigerant-containing side 9a of the gap 9 between the fixed-side member and rotating-side member of the relatively rotating member 5, and reaches the sealing member 10.

The space 7 between the refrigerant tube and rotating member, the space 8 between the refrigerant tube extension section and rotating member extension section, and the refrigerant-containing side 9a of the gap 9 between the fixed-side member and rotating-side member of the relatively rotating member 5 leading to the sealing member 10 make up the refrigerant zone.

The refrigerant zone, which is bordered on one side by the vacuum chamber 19, is thermally insulated by vacuum, and thus very little heat flows into the refrigerant zone. On the other hand, although there is very little heat inflow, some heat flows into the refrigerant while the refrigerant is flowing through the refrigerant zone. Consequently, the refrigerant in the refrigerant zone undergoes some temperature rise before reaching the sealing member 10 (magnetic fluid sealing member). The temperature rises to such an extent as to keep the magnetic fluid sealing member from freezing.

This allows the magnetic fluid sealing member to be used as the sealing member 10.

The magnetic fluid sealing member is advantageous in terms of high sealing performance and extremely low heat generation from friction, but has the disadvantage of being unserviceable due to freezing at low temperatures.

According to the present invention, the temperature rises while the refrigerant flows through the elongate refrigerant zone, rising to such an extent as to keep the magnetic fluid sealing member from freezing until the refrigerant reaches the sealing member 10 (magnetic fluid sealing member). This allows the magnetic fluid sealing member to be used as the sealing member 10 and thereby allows high sealing ability to be achieved.

On the other hand, from the perspective of heat input to the refrigerant, the magnetic fluid sealing member generates very little heat from friction, and has insignificant thermal effect on the refrigerant to begin with. Moreover, since the sealing portion between the rotary part and stationary part of the rotary joint is located well away from the refrigerant tube 3, i.e., across the long refrigerant zone from the refrigerant tube 3 serving as a main body of a refrigerant container, the heat input to the refrigerant is extremely low, making it possible to prevent temperature rises of the refrigerant. This results in an extremely high-efficiency, cryo-rotary joint.

The pressure chamber 20 has a function to prevent the magnetic fluid sealing member from being carried away.

The refrigerant in the refrigerant zone is at a fixed pressure. Also, if the temperature of the refrigerant rises from some cause, the pressure of the refrigerant increases. The magnetic fluid sealing member can remain in position against a certain pressure if concavity and convexity are provided in the gap 9 between the fixed-side member and rotating-side member of the relatively rotating member 5 and a magnet is buried in the fixed-side member 5a or rotating-side member 5b as with the present invention.

However, if the pressure of the refrigerant increases beyond expectations, the magnetic fluid sealing member could flow out from the gap 9 between the fixed-side member and rotating-side member of the relatively rotating member 5.

To deal with this, the present invention includes the pressure chamber 20 whose pressure can prevent the magnetic fluid sealing member from being carried away.

Incidentally, although the pressure chamber 20 may be at normal pressure, a pressure flow path communicated with an external pressure source may be installed in the pressure chamber 20 to measure the pressure in the pressure chamber 20 and pressure of the refrigerant and the pressure in the pressure chamber 20 may be controlled by a computer to balance the pressure in the pressure chamber 20 with the pressure of the refrigerant.

Next, an embodiment suitable for maintenance of the sealing member will be described.

Figure 4:
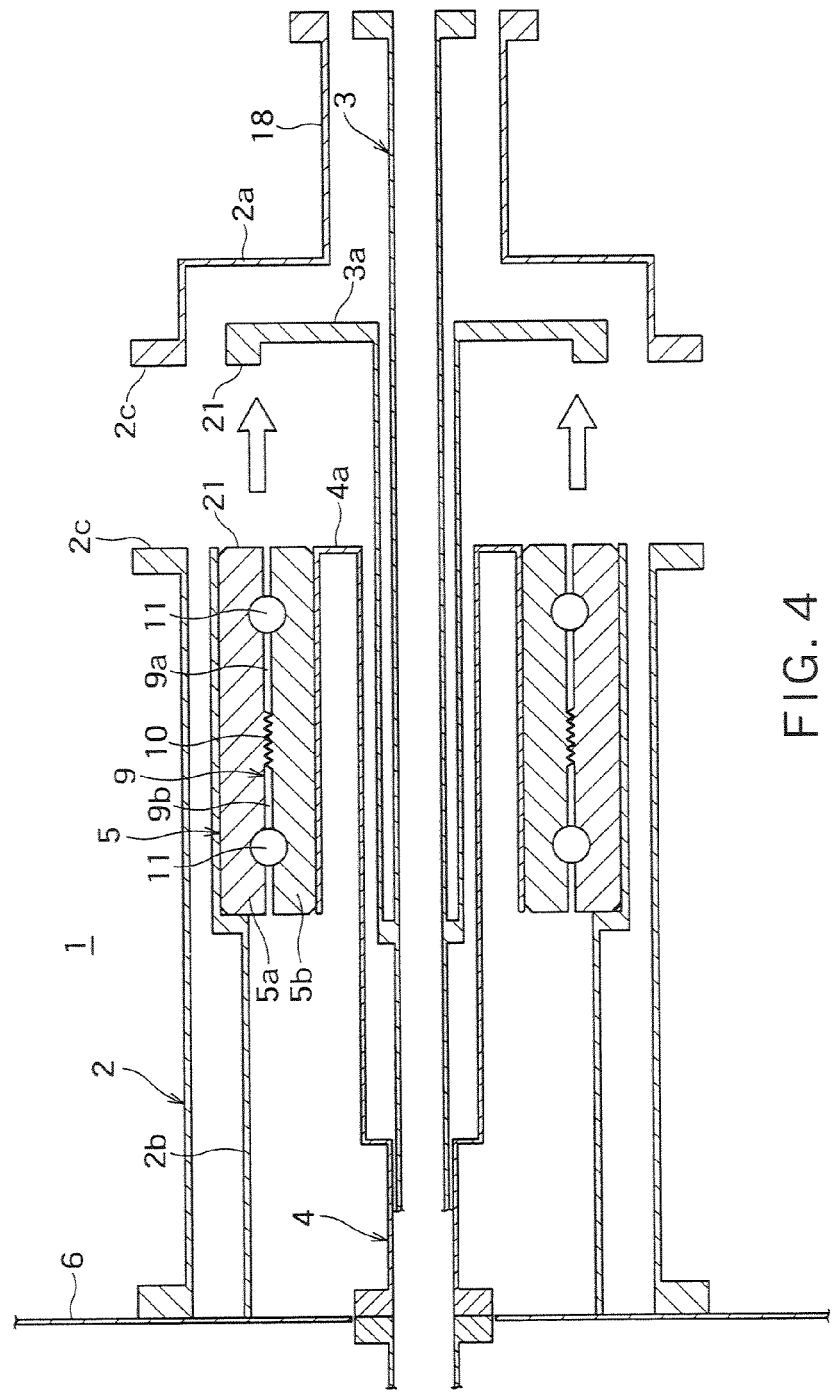
FIG. 4 is an explanatory diagram showing a disassembly method for the cryo-rotary joint according to the embodiment of the present invention.

FIG. 4 shows an embodiment of a disassembly method suitable for maintenance of the sealing member. The same components as those in the first to third embodiments are denoted by the same reference numerals as the corresponding components, and redundant description thereof will be omitted.

As shown in FIG. 4, according to the embodiment suitable for maintenance of the sealing member, the housing 2 has connecting surfaces 2c disconnectable in a direction orthogonal to an axial direction of the refrigerant tube 3. A connection 21 between the fixed-side member 5a of the relatively rotating member and the refrigerant tube extension section 3a is configured to be separable.

During maintenance of the sealing member, by disconnecting the connecting surfaces 2c of the housing and separating the connection 21 between the fixed-side member of the relatively rotating member and the refrigerant tube extension section, the refrigerant tube 3 and the refrigerant tube extension section 3a are unplugged.

When the refrigerant tube 3 and the refrigerant tube extension section 3a are unplugged, the sealing member installed around the relatively rotating member 5 becomes accessible. Consequently, the sealing member which will get worn or otherwise consumed can be inspected, replaced, and so on.

Next, description will be given of an embodiment in which an additional sealing member is installed in the refrigerant zone before reaching the sealing member 10 in the sealing portion between the rotary part and stationary part of the rotary joint.

Figure 5:
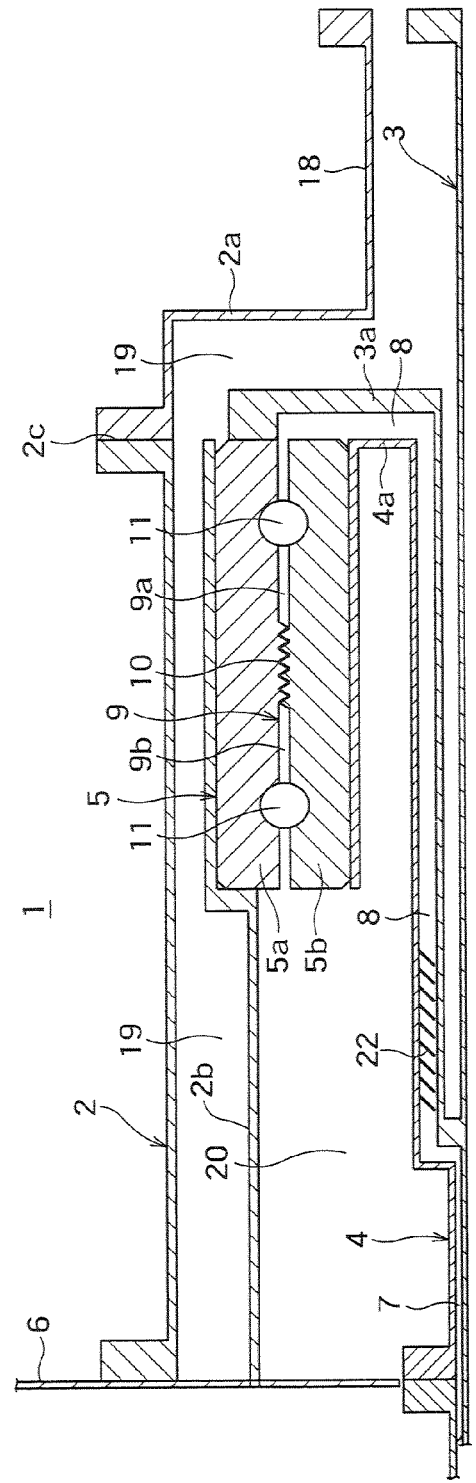
FIG. 5 is a longitudinal sectional view of a cryo-rotary joint according to another embodiment of the present invention with an additional low-temperature resistant sealing member installed.
Figure 6:
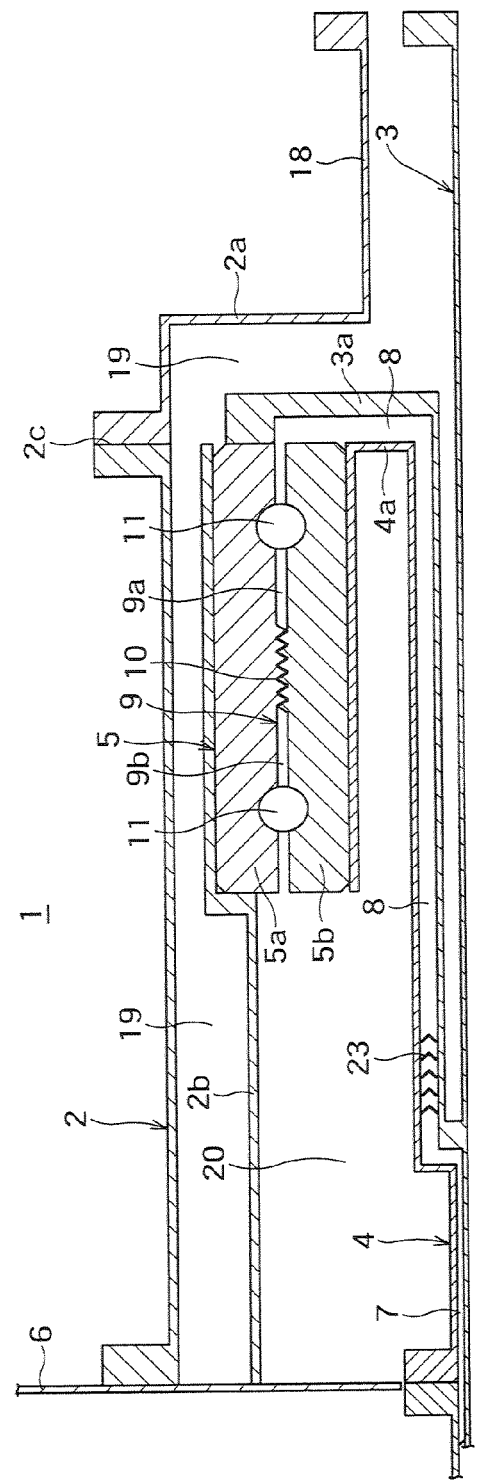
FIG. 6 is a longitudinal sectional view of a cryo-rotary joint according to still another embodiment of the present invention with an additional low-temperature resistant sealing member installed.

FIGS. 5 and 6 show an embodiment in which an additional low-temperature resistant sealing member is installed in the refrigerant zone running to the sealing member in the sealing portion between the rotary part and stationary part of the rotary joint. The same components as those in the first to fourth embodiments are denoted by the same reference numerals as the corresponding components, and redundant description thereof will be omitted.

FIG. 5 shows an embodiment in which a baffle sealing member 22 is installed in that part of the refrigerant zone which is close to the refrigerant tube 3, where the baffle sealing member 22 is a low-temperature resistant sealing member and the refrigerant zone is formed by the space 7 between the refrigerant tube and rotating member, the space 8 between the refrigerant tube extension section and rotating member extension section, and the refrigerant-containing side 9a of the gap 9 between the fixed-side member and rotating-side member of the relatively rotating member 5.

FIG. 6 shows an embodiment in which a Teflon sealing member 23 is similarly installed in that part of the refrigerant zone which is closer to the refrigerant tube 3 than to the sealing member 10, where the Teflon sealing member 23 is a low-temperature resistant sealing member.

The baffle sealing member 22 and Teflon sealing member 23 has resistance against low-temperature, but are more or less inferior in sealing ability to the magnetic fluid sealing member. However, the present invention does not expect high sealing ability from the low-temperature resistant sealing members 22 and 23. In other words, by taking advantage of the above properties, the present invention reduces frictional heat by weak forces and prevents large amounts of refrigerant from flowing to the sealing member 10.

That is, according to the present embodiment, the baffle sealing member 22 or Teflon sealing member 23 can limit the flow rate of the refrigerant and pressure from the downstream, and thereby allow the sealing member 10, and especially the magnetic fluid sealing member, to function in sound condition.

Next, an embodiment in which the refrigerant tube 3 is a double wall tube will be described.

Figure 7:
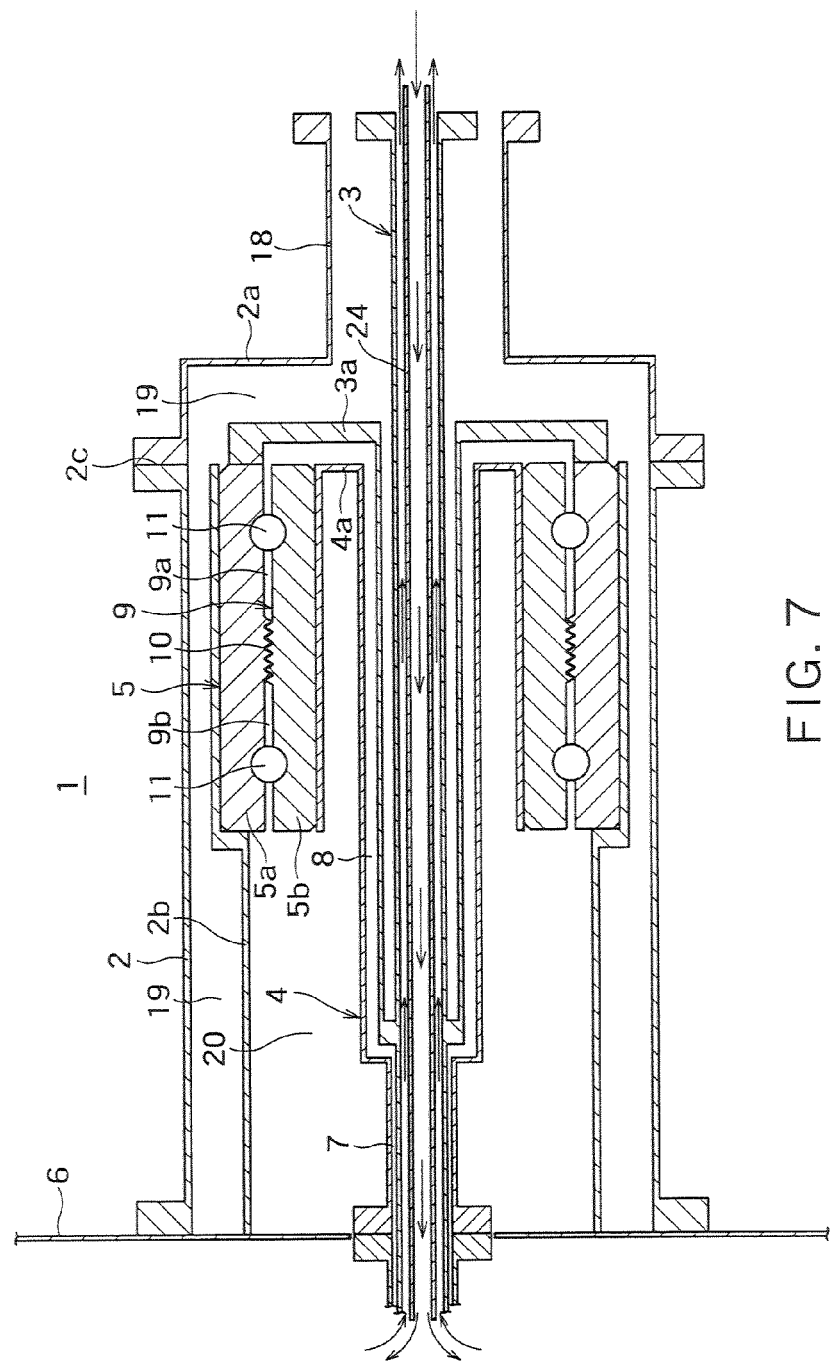
FIG. 7 is a longitudinal sectional view of a cryo-rotary joint according to another embodiment of the present invention, in which a double wall tube is used as a refrigerant tube.

FIG. 7 shows an embodiment in which the refrigerant tube 3 is a double wall tube. In FIG. 7, the same components as those in the first to sixth embodiments are denoted by the same reference numerals as the corresponding components, and redundant description thereof will be omitted.

Even if the refrigerant tube 3 is a single wall tube, the refrigerant forms a supply-side passage and return-side passage in the tube, allowing the refrigerant to be delivered and returned.

However, the use of a double wall tube for the refrigerant tube 3 allows the refrigerant to be delivered and returned at a high flow rate.

As shown in FIG. 7, according to the present embodiment, the refrigerant tube 3 is configured to be a double wall tube equipped with an inner tube 24 for refrigerant supply.

The present embodiment makes it possible to deliver the refrigerant from the inner tube 24 for refrigerant supply to the target part of the rotating machine as indicated by an arrow in FIG. 7, return the refrigerant from a flow path between outer tube and inner tube 24 of the refrigerant tube 3, and cool the target part of the rotating machine efficiently by delivering the refrigerant in large volumes.

Next, a cryo-rotary joint incorporated in a main body of the rotating machine will be described.

Figure 8:
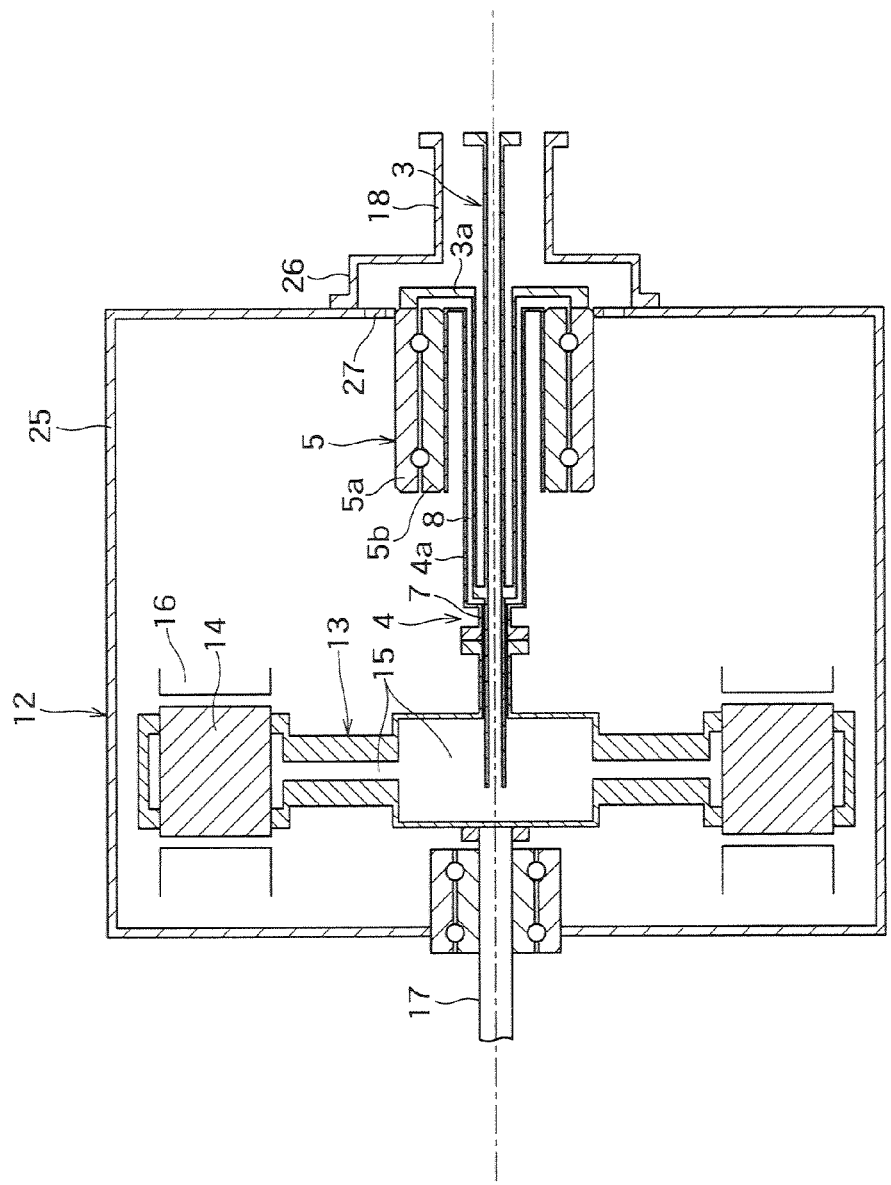
FIG. 8 is a longitudinal sectional view of a cryo-rotary joint according to an embodiment of the present invention, where the cryo-rotary joint is incorporated in a main body of a rotating machine.

FIG. 8 shows an embodiment of the cryo-rotary joint incorporated in the main body of the rotating machine. In FIG. 8, the same components as those in the first to seventh embodiments are denoted by the same reference numerals as the corresponding components, and redundant description thereof will be omitted.

According to the present embodiment, the rotating machine 12 has a rotating-machine housing 25. The refrigerant tube 3 is installed within the rotating-machine housing 25, connected at one end to an external refrigerant source (not shown), and communicated at the other end with a target part (the rotor 13 and superconductor 14) in the rotating machine.

The rotating member 4 is installed within the rotating-machine housing 25, loosely fitted inside with the refrigerant tube 3, and fixed at one end to the rotary part (rotor 13) of the rotating machine 12.

The relatively rotating member 5 is coaxial with the refrigerant tube 3 and rotating member 4 and the fixed-side member 5a is fixed to the rotating-machine housing 25.

The rotating-side member 5b of the relatively rotating member 5 is rotatably disposed inside the fixed-side member 5a.

That is, according to the present embodiment, the relatively rotating member 5 is incorporated in the rotating-machine housing 25.

The evacuation tube 18 is equipped with a large-diameter portion 26 larger in diameter than the fixed-side member 5a and fixed to an end wall of the rotating-machine housing 25.

An evacuation opening 27 is provided in the end wall of that part of the rotating-machine housing 25 which is located inside the large-diameter portion 26 of the evacuation tube.

As a result of evacuation through the evacuation tube 18, a vacuum is created in an inner part of the rotating machine 12 and around the refrigerant zone formed by the space 7 between the refrigerant tube and rotating member and the space 8 between the refrigerant tube extension section and rotating member extension section.

According to the present embodiment, the cryo-rotary joint otherwise sticking out of the rotating machine 12 can be contained in the rotating machine 12, allowing considerable downsizing in the length direction.

Also, a housing member as well as a vacuum mechanism can be shared by the rotating machine and cryo-rotary joint.

Also, the refrigerant zone formed by the space 7 between the refrigerant tube and rotating member and the space 8 between the refrigerant tube extension section and rotating member extension section is thermally insulated from both sides by vacuum, resulting in a still smaller, high-efficiency, cryo-rotary joint.

Finally, an embodiment which uses an ultrasmall pressure chamber will be described.

Figure 9:
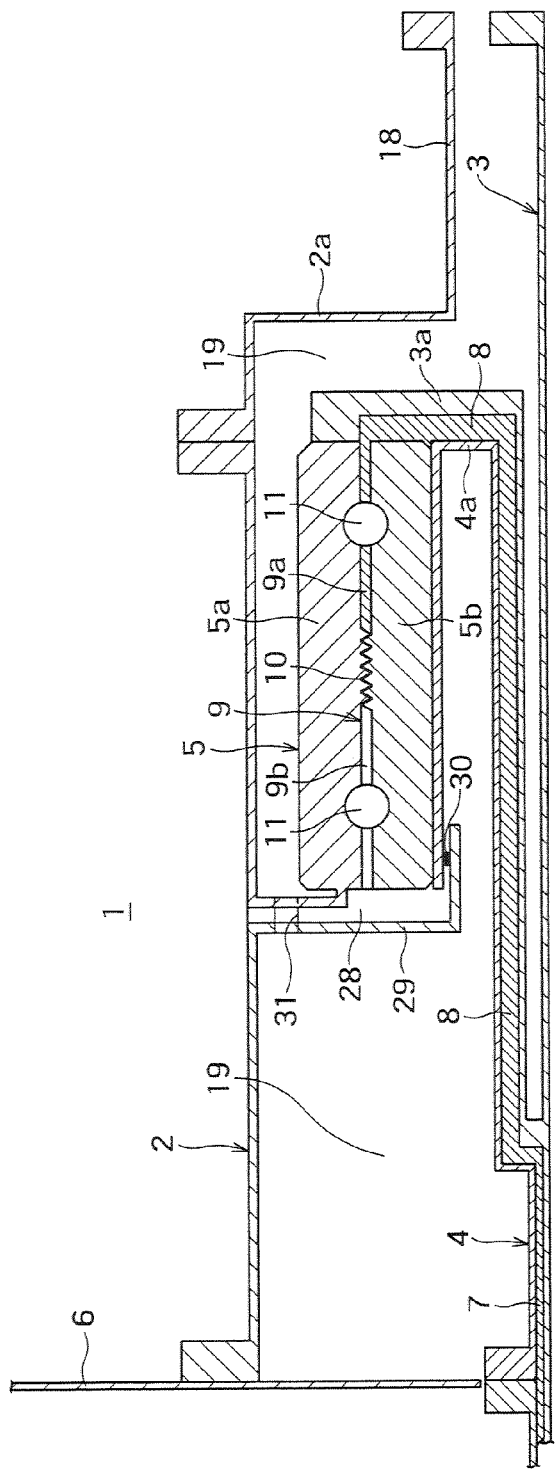
FIG. 9 is a longitudinal sectional view of a cryo-rotary joint according to an embodiment of the present invention, in which a pressure chamber is installed, being communicated with a refrigerant-free side of a gap between a fixed-side member and rotating-side member of a relatively rotating member.
Figure 10:
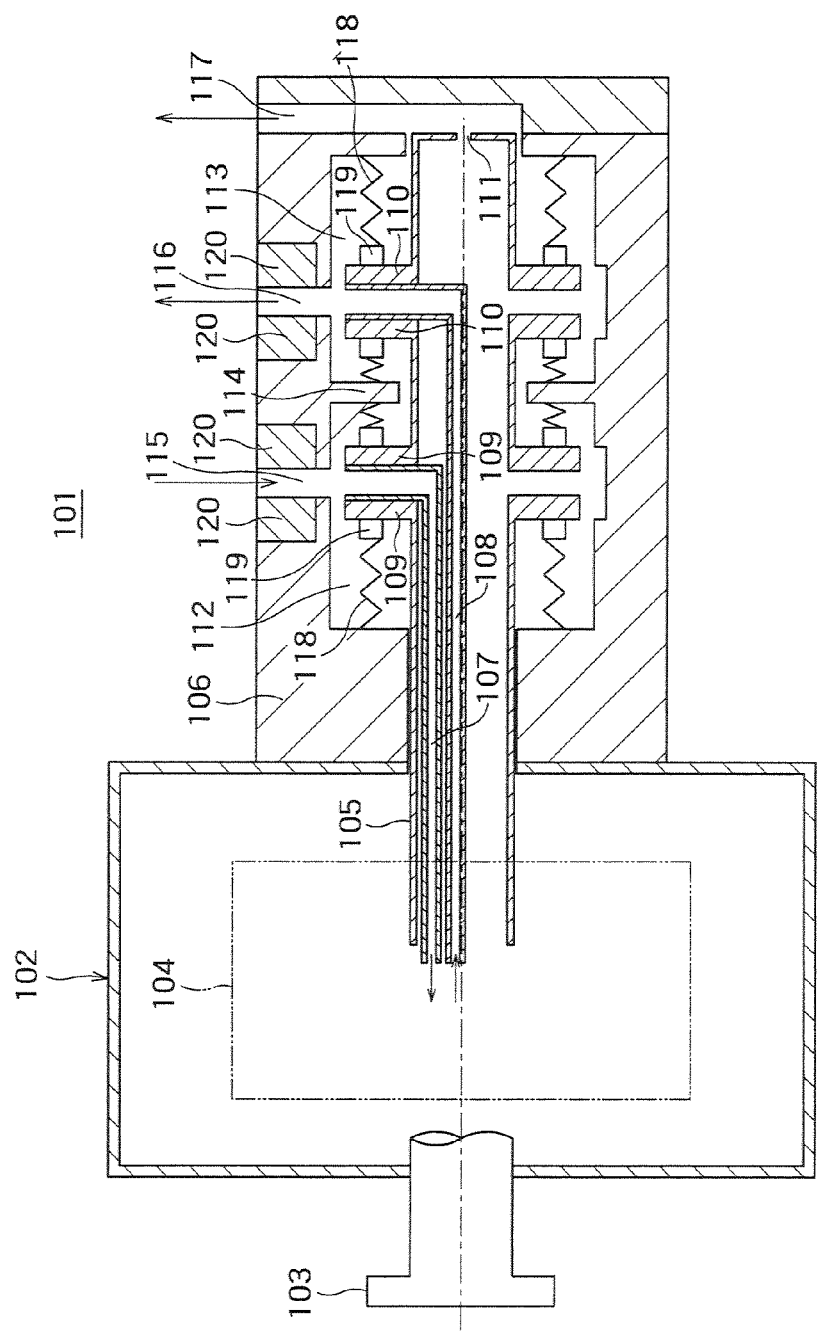
FIG. 10 is a longitudinal sectional view of a conventional cryo-rotary joint.

FIG. 9 shows an embodiment which uses an ultrasmall pressure chamber. In FIG. 9, the same components as those in the first to eighth embodiments are denoted by the same reference numerals as the corresponding components, and redundant description thereof will be omitted.

As shown in FIG. 9, according to the present embodiment, a pressure chamber member 29 is installed to form a pressure chamber 28 communicated with a refrigerant-free side 9b of the gap 9 between the fixed-side member and rotating-side member of the relatively rotating member 5.

The pressure chamber member 29 is extended from the housing 2, connected to the fixed-side member 5a of the relatively rotating member, and engaged with the rotating-side member 5b of the relatively rotating member via a sealing member 30.

The pressure chamber member 29 has an annular shape as a whole and an evacuation opening 31 is provided in part of the pressure chamber 28.

According to the present embodiment, the pressure chamber 28 is evacuated through the evacuation tube 18 to establish an appropriate pressure in the pressure chamber 28.

As a result of evacuation through the evacuation tube 18, a vacuum is created in the entire the housing 2 through the evacuation opening 31. However, pressure is designed to be applied to the refrigerant-free side 9b of the gap 9 between the fixed-side member and rotating-side member of the relatively rotating member 5 from the pressure chamber 28.

When a vacuum is created in the entire the housing 2, the refrigerant zone formed by the space 7 between the refrigerant tube and rotating member and the space 8 between the refrigerant tube extension section and rotating member extension section is thermally insulated from both sides by vacuum, making it possible to further reduce the heat input to the refrigerant.

Also, as the pressure of the pressure chamber 28 is applied to the refrigerant-free side 9b of the gap 9 between the fixed-side member and rotating-side member of the relatively rotating member 5, even if the refrigerant pressure rises for some reason, the magnetic fluid sealing member used as a sealing member can be kept in place, preventing outflows of the magnetic fluid sealing member.

DESCRIPTION OF SYMBOLS

1 Cryo-rotary joint
2 Housing
2a End wall of the housing
2b Housing member
2c Connecting surface of the housing
3 Refrigerant tube
3a Refrigerant tube extension section
4 Rotating member
4a Rotating member extension section
5 Relatively rotating member
5a Fixed-side member
5b Rotating-side member
6 End wall of the rotating machine 7 Space between the refrigerant tube and rotating member
8 Space between the refrigerant tube extension section and the rotating member extension section
9 Gap between the fixed-side member and rotating-side member of the relatively rotating member 5
9a Refrigerant-containing side of the gap between the fixed-side member and rotating-side member of the relatively rotating member 5
9b Refrigerant-free side of the gap between the fixed-side member and rotating-side member of the relatively rotating member 5
10 Sealing member
11 Ball bearing
12 Rotating machine
13 Rotor
14 Superconductor
15 Cooling flow path
16 Field coil or armature coil
17 Output shaft
18 Evacuation tube
19 Vacuum chamber
20 Pressure chamber
21 Connection between the fixed-side member of the relatively rotating member and the refrigerant tube extension section
22 Baffle sealing member
23 Teflon sealing member
24 Inner tube for refrigerant supply
25 Rotating-machine housing
26 Large-diameter portion of the evacuation tube
27 Evacuation opening
28 Pressure chamber
29 Pressure chamber member
30 Sealing member
31 Evacuation opening
101 Cryo-rotary joint
102 Rotating machine
103 Output shaft
104 Target part
105 Rotating shaft
106 Housing
107 Refrigerant supply tube
108 Refrigerant return tube
109 Disk-shaped rotating-side member
110 Disk-shaped rotating-side member
111 Evacuation hole
112 Refrigerant chamber
113 Refrigerant chamber
114 Disk-shaped partition wall
115 Refrigerant supply channel
116 Refrigerant return channel
117 Evacuated channel
118 Bellows
119 Sealing member
120 Sealing member

The invention claimed is:

1. A cryo-rotary joint comprising:
a housing;
a refrigerant tube configured to be non-rotating, installed within the housing, connected at one end to an external refrigerant source, communicated at the other end with a target part in a rotating machine, and adapted to allow a refrigerant to pass inside;
a rotating member installed within the housing, loosely fitted inside with the refrigerant tube, and configured to be rotatable together with a rotary part of the rotating machine by being fixed at one end to the rotary part; and
a relatively rotating member configured to be cylindrical in shape and coaxial with the refrigerant tube and the rotating member and equipped with a fixed-side member fixed to an inner surface of the housing and a rotating-side member rotatably disposed inside the fixed-side member,
the fixed-side member of the relatively rotating member being connected to the refrigerant tube via a refrigerant tube extension section,
the rotating-side member of the relatively rotating member being connected to the rotating member via a rotating member extension section,
a space between the refrigerant tube and the rotating member as well as a space between the refrigerant tube extension section and the rotating member extension section being communicated with a gap between the fixed-side member and rotating-side member of the relatively rotating member to form a refrigerant zone,
a sealing member being positioned to seal between adjacent surfaces of the fixed-side member and the rotating-side member of the relatively rotating member, and
a vacuum chamber and a pressure chamber being defined within the housing by a peripheral wall of the refrigerant tube, the refrigerant tube extension section, and the fixed-side member of the relatively rotating member with the refrigerant zone between the refrigerant tube extension section and the rotating member extension section being thermally insulated by the vacuum chamber.

2. The cryo-rotary joint according to claim 1, wherein the sealing member installed between the fixed-side member and rotating-side member of the relatively rotating member is made of a magnetic fluid sealing member.

3. The cryo-rotary joint according to claim 1, wherein a low-temperature resistant sealing member is installed at that part of the refrigerant zone which is closer to the refrigerant tube than to the sealing member.

4. The cryo-rotary joint according to claim 1, wherein the gap between the fixed-side member and rotating-side member of the relatively rotating member is pressurized by pressure of the pressure chamber from a refrigerant-free side.

5. The cryo-rotary joint according to claim 1, further comprising a pressure chamber member which forms a pressure chamber connected to the fixed-side member of the relatively rotating member, engaged with the rotating-side member of the relatively rotating member via the sealing member, and communicated with a refrigerant-free side of the gap between the fixed-side member and rotating-side member of the relatively rotating member, wherein
the gap between the fixed-side member and rotating-side member of the relatively rotating member is pressurized by pressure of the pressure chamber from a refrigerant-free side; and the refrigerant zone between the refrigerant tube extension section and the rotating member extension section is thermally insulated by vacuum from at least one side.

6. The cryo-rotary joint according to claim 1, wherein
the housing has connecting surfaces disconnectable in a direction orthogonal to an axial direction of the refrigerant tube;
a connection between the fixed-side member of the relatively rotating member and the refrigerant tube extension section is configured to be separable; and
the refrigerant tube and the refrigerant tube extension section thereof is configured to be unpluggable when the connecting surfaces of the housing are disconnected.

7. The cryo-rotary joint according to claim 1, wherein the refrigerant tube is a double wall tube having an inner tube for refrigerant supply.

8. A cryo-rotary joint comprising:
- a rotating-machine housing;
- a refrigerant tube configured to be non-rotating, installed within the rotating-machine housing, connected at one end to an external refrigerant source, communicated at the other end with a target part of a rotating machine, and adapted to allow a refrigerant to pass inside;
- a rotating member installed within the rotating-machine housing, loosely fitted inside with the refrigerant tube, and configured to be rotatable together with a rotary part of the rotating machine by being fixed at one end to the rotary part; and
- a relatively rotating member configured to be cylindrical in shape and coaxial with the refrigerant tube and the rotating member and equipped with a fixed-side member fixed to the rotating-machine housing and a rotating-side member rotatably disposed inside the fixed-side member,
- the fixed-side member of the relatively rotating member being connected to the refrigerant tube via a refrigerant tube extension section,
- the rotating-side member of the relatively rotating member being connected to the rotating member via a rotating member extension section,
- a space between the refrigerant tube and the rotating member as well as a space between the refrigerant tube extension section and the rotating member extension section being communicated with a gap between the fixed-side member and rotating-side member of the relatively rotating member to form a refrigerant zone,
- a sealing member being positioned to seal between adjacent surfaces of the fixed-side member and the rotating-side member of the relatively rotating member, and
- a vacuum chamber and a pressure chamber being defined within the housing by a peripheral wall of the refrigerant tube, the refrigerant tube extension section, and the fixed-side member of the relatively rotating member with the refrigerant zone between the refrigerant tube extension section and the rotating member extension section being thermally insulated by the vacuum chamber.

9. The cryo-rotary joint according to claim 8, wherein the sealing member installed between the fixed-side member and rotating-side member of the relatively rotating member is made of a magnetic fluid sealing member.

10. The cryo-rotary joint according to claim 8, wherein a low-temperature resistant sealing member is installed at that part of the refrigerant zone which is closer to the refrigerant tube than to the sealing member.

11. The cryo-rotary joint according to claim 8, wherein the gap between the fixed-side member and rotating-side member of the relatively rotating member is pressurized by pressure of the pressure chamber from a refrigerant-free side.

12. The cryo-rotary joint according to claim 8, further comprising a pressure chamber member which forms a pressure chamber connected to the fixed-side member of the relatively rotating member, engaged with the rotating-side member of the relatively rotating member via the sealing member, and communicated with a refrigerant-free side of the gap between the fixed-side member and rotating-side member of the relatively rotating member, wherein
- the gap between the fixed-side member and rotating-side member of the relatively rotating member is pressurized by pressure of the pressure chamber from a refrigerant-free side; and the refrigerant zone between the refrigerant tube extension section and the rotating member extension section is thermally insulated by vacuum from at least one side.

13. The cryo-rotary joint according to claim 8, wherein
- the housing has connecting surfaces disconnectable in a direction orthogonal to an axial direction of the refrigerant tube;
- a connection between the fixed-side member of the relatively rotating member and the refrigerant tube extension section is configured to be separable; and
- the refrigerant tube and the refrigerant tube extension section thereof is configured to be unpluggable when the connecting surfaces of the housing are disconnected.

14. The cryo-rotary joint according to claim 8, wherein the refrigerant tube is a double wall tube having an inner tube for refrigerant supply.

15. A cryo-rotary joint comprising:
- a housing;
- a refrigerant tube configured to be non-rotating, installed within the housing, connected at one end to an external refrigerant source, communicated at the other end with a target part in a rotating machine, and adapted to allow a refrigerant to pass inside;
- a rotating member installed within the housing, loosely fitted inside with the refrigerant tube, and configured to be rotatable together with a rotary part of the rotating machine by being fixed at one end to the rotary part; and
- a relatively rotating member configured to be cylindrical in shape and coaxial with the refrigerant tube and the rotating member and equipped with a fixed-side member fixed to an inner surface of the housing and a rotating-side member rotatably disposed inside the fixed-side member,
- the fixed-side member of the relatively rotating member being connected to the refrigerant tube via a refrigerant tube extension section,
- the rotating-side member of the relatively rotating member being connected to the rotating member via a rotating member extension section,
- a space between the refrigerant tube and the rotating member as well as a space between the refrigerant tube extension section and the rotating member extension section being communicated with a gap between the fixed-side member and rotating-side member of the relatively rotating member to form a refrigerant zone,
- a sealing member being installed between the fixed-side member and rotating-side member of the relatively rotating member, and the sealing member comprising a magnetic fluid sealing member, and
- a vacuum chamber and a pressure chamber being defined within the housing by a peripheral wall of the refrigerant tube, the refrigerant tube extension section, and the fixed-side member of the relatively rotating member with the refrigerant zone between the refrigerant tube extension section and the rotating member extension section being thermally insulated by the vacuum chamber.

16. The cryo-rotary joint according to claim 15, wherein a low-temperature resistant sealing member is installed at that part of the refrigerant zone which is closer to the refrigerant tube than to the sealing member.

17. The cryo-rotary joint according to claim 15, wherein the gap between the fixed-side member and rotating-side member of the relatively rotating member is pressurized by pressure of the pressure chamber from a refrigerant-free side.

18. The cryo-rotary joint according to claim 15, further comprising a pressure chamber member which forms a pressure chamber connected to the fixed-side member of the relatively rotating member, engaged with the rotating-side member of the relatively rotating member via the sealing member, and communicated with a refrigerant-free side of the gap between the fixed-side member and rotating-side member of the relatively rotating member, wherein
- the gap between the fixed-side member and rotating-side member of the relatively rotating member is pressurized by pressure of the pressure chamber from a refrigerant-free side; and the refrigerant zone between the refrigerant tube extension section and the rotating member extension section is thermally insulated by vacuum from at least one side.

19. The cryo-rotary joint according to claim 15, wherein
- the housing has connecting surfaces disconnectable in a direction orthogonal to an axial direction of the refrigerant tube;
- a connection between the fixed-side member of the relatively rotating member and the refrigerant tube extension section is configured to be separable; and
- the refrigerant tube and the refrigerant tube extension section thereof is configured to be unpluggable when the connecting surfaces of the housing are disconnected.

20. The cryo-rotary joint according to claim 15, wherein the refrigerant tube is a double wall tube having an inner tube for refrigerant supply.

\* \* \* \* \*